(12) United States Patent
Fiore (10) Patent No.: US 6,999,460 B1
(45) Date of Patent: Feb. 14, 2006

(54) ARBITRATED LOOP PORT SWITCHING

(75) Inventor: Edward J. Fiore, Ramsey, MN (US)

(73) Assignee: Storage Technology Corporation, Louisville, CO (US)

( * ) Notice: Subject to any disclaimer, the term of this patent is extended or adjusted under 35 U.S.C. 154(b) by 789 days.

(21) Appl. No.: 09/688,717

(22) Filed: Oct. 16, 2000
(Under 37 CFR 1.47)

(51) Int. Cl.
H04L 12/42 (2006.01)
H04L 12/403 (2006.01)
G06F 15/173 (2006.01)

(52) U.S. Cl. ............... 370/400; 370/452; 370/461; 709/224

(58) Field of Classification Search ............ 370/394, 370/230, 362, 514, 395, 235, 515, 293–351, 370/369–389, 400–462; 714/4, 6; 710/240, 710/241; 709/224–229, 238–239
See application file for complete search history.

(56) References Cited

U.S. PATENT DOCUMENTS

| | | | |
|---|---|---|---|
| 4,009,469 A | | 2/1977 | Boudreau et al. |
| 4,930,122 A | * | 5/1990 | Takahashi et al. ........ 370/473 |
| 5,233,607 A | | 8/1993 | Barwig et al. |
| 5,345,447 A | * | 9/1994 | Noel .................... 370/362 |
| 5,566,170 A | | 10/1996 | Bakke et al. |
| 5,619,497 A | * | 4/1997 | Gallagher et al. ......... 370/394 |
| 5,751,715 A | * | 5/1998 | Chan et al. ............. 370/455 |
| 5,812,754 A | * | 9/1998 | Lui et al. .................. 714/6 |
| 5,841,997 A | * | 11/1998 | Bleiweiss et al. .......... 710/317 |
| 6,055,228 A | * | 4/2000 | DeKoning et al. ........ 370/258 |
| 6,118,776 A | * | 9/2000 | Berman .................. 370/351 |
| 6,160,813 A | * | 12/2000 | Banks et al. ............. 370/422 |
| 6,185,203 B1 | * | 2/2001 | Berman .................. 370/351 |
| 6,192,054 B1 | * | 2/2001 | Chan et al. ............. 370/452 |
| 6,215,775 B1 | * | 4/2001 | Baldwin et al. .......... 370/258 |
| 6,314,488 B1 | * | 11/2001 | Smith .................. 710/240 |
| 6,317,800 B1 | * | 11/2001 | Westby et al. ............ 710/40 |
| 6,324,181 B1 | * | 11/2001 | Wong et al. ............. 370/403 |
| 6,401,128 B1 | * | 6/2002 | Stai et al. ............... 709/236 |
| 6,459,701 B1 | * | 10/2002 | Henson et al. ........... 370/405 |
| 6,470,007 B1 | * | 10/2002 | Berman .................. 370/351 |
| 6,546,498 B1 | * | 4/2003 | Saegusa .................. 714/4 |
| 6,553,036 B1 | * | 4/2003 | Miller et al. ............. 370/462 |
| 6,614,796 B1 | * | 9/2003 | Black et al. ............. 370/403 |
| 6,687,219 B1 | * | 2/2004 | Xue et al. ............... 370/222 |
| 6,697,914 B1 | * | 2/2004 | Hospodor et al. ......... 711/112 |
| 6,742,090 B2 | * | 5/2004 | Sanada et al. ........... 711/152 |

FOREIGN PATENT DOCUMENTS

WO    WO 98 36537 A    8/1998

OTHER PUBLICATIONS

Gadzoox Networks, Capellix 2000 San Swtich, 4 pages.
Clark, Tom, Vixel, White paper, What is Loop Switching?, Jan., 2000, pp. 1-8.
Warford, Joel, Gadzoox, Whitepaper, Loop Switch Technology Accelerates Next Phase of SAN Deployment, pp. 1-6.
"Fibre Channel Overview", Zoltan Meggyesi, Research Institute For Particle and Nuclear Physics, Hungary.
Fibre Channel, Non Adjacent Communications.
"Fibre Channel Basics", Steve Nowack, StorageTek Network Systems, StorageTek Technical White Paper.

* cited by examiner

Primary Examiner—Man U. Phan
(74) Attorney, Agent, or Firm—Brooks Kushman P.C.

(57) ABSTRACT

A hub connects groups of nodes to form a separate communication loop permitting access to the full bandwidth of the separate communication loop. The switching hub may operate from a subset of the messages defined in the Fiber Channel arbitrated loop protocol while allowing the nodes to use the full protocol.

36 Claims, 4 Drawing Sheets

ARBITRATED LOOP PORT SWITCHING

TECHNICAL FIELD

The present invention relates to routing data between various devices such as may be interconnected through hubs, storage area networks, networked attached storage, and the like.

BACKGROUND ART

Large computer storage systems comprise arrays of disk and tape drives with several controllers directing the flow of data between the disk drives and the computers. A common network topology is to have drives linked together by two linear unidirectional communication busses running in opposite directions with a controller at each end. This approach allows both controllers to communicate with each drive in the array. In practice, the workload between the controllers is often divided so that one controller services only a subset of the drives, while the other controller services another, possibly overlapping, subset of drives.

The performance of such an arrangement varies, in part, with the topology of the interconnection network. For example, each controller has a direct link to the first drive immediately adjacent on the bus. Since no other controller communicates across this segment of the bus, the full bandwidth of the bus is available between the controller and the first adjacent drive. However, as the controller tries to communicate with drives further away on the network, the controller may come into contention with other controllers trying to communicate with other drives causing an effective reduction in the available bandwidth. Another limitation of this approach is that the network relies on the continued operation of all drives at all times to keep the busses operational. When a drive fails or loses power, the busses are broken at that point, isolating the controllers from drives on the far side of the failed device.

Another network topology replaces the linear unidirectional communication buses with two communication loops. In this topology there is one controller per loop. This approach also allows both controllers to access all of the disk drives in the array, and eliminates contentions between controllers by isolating them on separate loops. This approach has a practical limitation in that each disk drive must have one loop interface for each communication loop to which it is tied. As the number of controllers on dedicated communication loops increases, the cost of each drive increases due to the increase in the number of interfaces it must support. This approach may also be susceptible to failed nodes disrupting the network. If the network technology cannot route the messages through an unpowered or failed node, then the loop is broken at that point, preventing controller access to the disk drives further around the loop.

In a Fibre Channel (FC) network, devices such as controllers and drives are connected by a network or arbitrated loop. Only two of the devices may communicate over a loop or point-to-point network at one time. Other devices must wait to communicate. The system latency of a Fibre Channel arbitrated loop may be reduced by subdividing the network into multiple subloops. Each subloop can operate independently thus allowing for one message transfer operation to occur simultaneously within each of the subloops. Applying this approach to disk arrays, one controller and the disk drives it services most can be assigned to each subloop. When the controller in one subloop places a request to communicate with a drive in another subloop, a hub links the two subloops. Linking the subloops through the hub allows any controller to reach any drive in the array. However, the hub only supports one source-to-destination inter-subloop link at a time. Further, while the inter-subloop link is established, the controllers in the source and destination subloops must arbitrate with each other. As with other loop topologies, a failed or unpowered node in a subloop may disrupt that subloop.

Hubs have been used to eliminate loop topology vulnerability to a break in the loop. The hubs physically connects to each of the nodes in a star type arrangement with connections radiating out from the hub. If a node fails or loses power, the hub circuitry senses the loss of message traffic to and from the node and switches out the failed node. Individual drives and controllers can be switched out due to failure or for maintenance and repair without a major disruption to the rest of the network. Further, new devices can be switched into the loop while the network is operational. Limitations with this approach include high cost and the need to share network bandwidth with all controllers competing for use of the network.

DISCLOSURE OF INVENTION

The present invention connects a group of nodes, such as controllers and drives, onto a separate or private communication loop so that the group of nodes accesses the full bandwidth of the private communication loop. The apparatus and method of the present invention are adaptable to any arbitrated loop network. In an embodiment, a hub operates from a subset of the messages defined in the Fibre Channel arbitrated loop protocol while allowing each node to use the full protocol.

The present invention provides for a hub interconnecting a plurality of nodes, each node having a channel over which data is transmitted and received. The hub includes a port interface in communication with each node through the channel. Each port sends data over a send data path and receives data over a receive data path. An interconnect device forwards data between any send data path and any receive data path. A controller signals the interconnect device to form at least one separate communication loop including at least two of the nodes. The controller may form each separate communication loop based on a message received from at least one port included in the separate communication loop.

A method of interconnecting a plurality of nodes is also provided. A request is received from a first node to access a second node. A determination is made as to whether or not the second node is not busy. If the second node is not busy, a separate communication loop is formed including the first node and the second node.

In an embodiment, a request is received from the first node to access a third node. If the third node is not busy, the third node is joined in the separate loop including the first node and the second node.

The present invention also provides a switching hub connected to each node of a multiple node network with a sending channel and a receiving channel. The switching hub has an interconnect switch capable of connecting the sending channel and the receiving channel of each node into a separate communication loop. The switching hub has a plurality of port interfaces, each port interface linking the respective receiving channel and the respective sending channel of each node to the interconnect switch. Each port interface detects messages on the receiving channel. A controller controls the interconnect switch to form at least one separate communication loop based on at least one detected message.

In an embodiment of the present invention, the plurality of nodes communicate with each other using a protocol defining message types including Arbitration, which contains at least a source addresses, Open, which contains at least a source address and a destination address, and Close.

In another embodiment of the present invention, the controller forms a separate communication loop connecting a first node and a second node, the first node requesting access to the second node. The controller may also form the separate communication loop connecting a third node requested by the first node. The controller may also form the separate communication loop connecting a fourth node requesting access to the second node.

A method for controlling multiple nodes on a network is also provided. A first node places an access request and is connected to a separate communication loop. The first node requests a message transfer operation with a second node. The second node is added to the separate communication loop. When connection is no longer required, a close message is received. The nodes may be released from the separate communication loop if its status is not busy after a waiting period times-out.

These and other objects, features and advantages will be readily apparent upon consideration of the following detailed description in conjunction with the accompanying drawings.

BEST MODE FOR CARRYING OUT THE INVENTION

Figure 1:
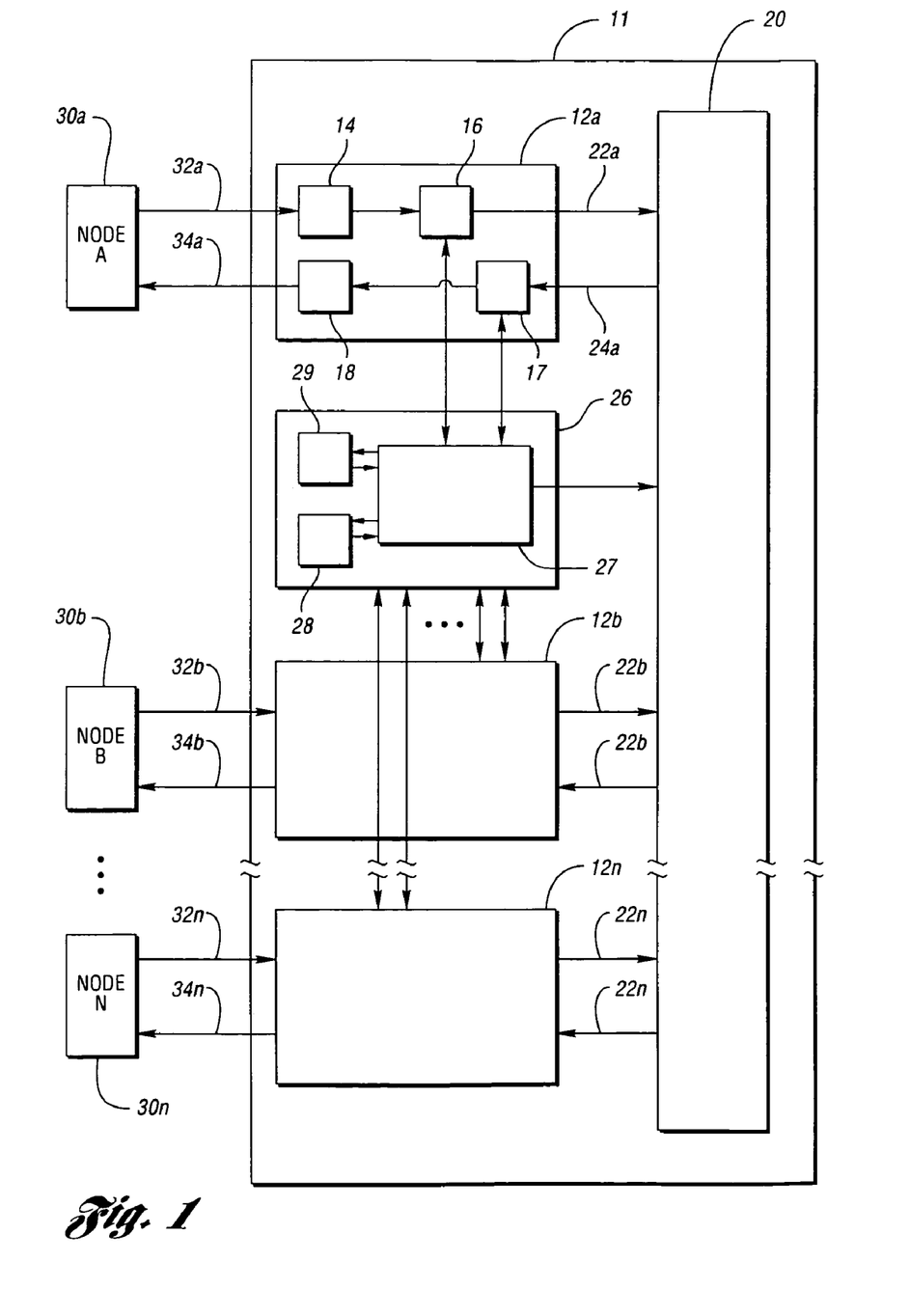
FIG. 1 is an electrical block diagram of the switching hub according to an embodiment of the present invention.

Referring to FIG. 1, an embodiment of the invention where switching hub 11 connects multiple nodes 30a–30n using the Fibre Channel arbitrated loop protocol is shown. Each node 30a–30n may be an input/output controllers and drives, such as may be used for magnetic or optical tapes or disks, processors, communication interfaces, monitoring and debugging equipment, and the like. Each of the nodes 30a–30n communicates with port interfaces 12a–12n, respectively, over a channel, such as a pair of sending channels 32a–32n and receiving channels 34a–34n. Each port interface 12a–12n also connects with interconnect switch 20 over receive data path 22a–22n and send data path 24a–24n respectively. Interconnect switch 20 can transfer data from any receive data path 22a–22n to any send data path 24a–24n under the control of controller 26.

Port interface 12a illustrates the internal detail of a typical port interface. A receiver 14 converts the serial stream of signals arriving on receiving channel 32a into parallel data, typically ten or twenty bits wide. The receiver 14 may also perform 8b/10b decoding of the data before passing the data to decoder 16. The decoder 16 examines each message to determine the message type and, where appropriate, the message source address and destination address. The decoder 16 may buffer messages or send messages directly to interconnect switch 20 through receive data path 22a. Messages leaving the interconnect switch 20 on send data path 24a flow to a multiplexer 17. The multiplexer 17 may also decode messages and notify the controller 26 of the message types, source addresses and destination addresses. The multiplexer 17 then passes the messages along to a transmitter 18. The transmitter 18 perform the 8b/10b encoding of the data and converts parallel data into a serial stream of signals which are transmitted across the sending channel 32a to the node 30a. The multiplexer 17 can transfer messages to the transmitter 18 from the sent data path 24a or from the controller 26.

Initially, each port interface 12a–12n is set to send Idle until a frame is received from an attached node 30a–30n. When decoder 16 of port interface 12a detects an Arbitration message, it notifies the controller 26 of the message type and the source address. Controller 26 may then set interconnect switch 20 to route information from receive path 22a to send data path 24a, effectively placing node 30a on its own private loop. When decoder 16 then receives an Open message, decoder 16 notifies the controller 26 of the message type, the source address and the destination address, and buffers the Open message until commanded by the controller 26 to release it to the interconnect switch 20. When the message type is Close, the decoder 16 notifies the controller 26 of the message type and passes the message along to the interconnect switch 20.

The interconnect switch 20 forms data paths between the nodes 30a–30n. A convenient initialization configuration is to daisy chain each of the receive data paths 22a–22n to the adjacent send data paths 24a–24n to connect all of the nodes 30a–30n together as one main communication loop. Receive data path 22a is connected to send data path 24b, receive data path 22b is connected to send data path 24c, receive data path 22c is connected to send data path 24d, and so on until receiving data path 22n is connected to send data path 24a. The interconnect switch 20 can then switch the connections in response to commands from the controller 26 to create one or more separate, private communication loops with one or more nodes per loop. Interconnect switch 20 may be any device capable of forming multiple point-to-point logical connections such as, for example, one or more cross-point switches, cross-bar switches, routers, multiplexors, and the like.

The controller 26 is composed of a processor 27, a busy port store 28, and a valid arbitration loop address store 29. Stores 28, 29 may be implemented using a content addressable memory (CAM), a look-up table, or any other suitable means. The busy port store 28 is used by the processor 27 for very fast address comparisons to determine the busy/not busy status of the nodes. Nodes actively involved in message transfer operations are "busy", those that are not are "not busy." The valid arbitration loop address store 29 is used by the processor 27 for high speed storage and comparison of message types and communication loop configurations. The processor 27 makes logic decisions and issues commands to the interconnect switch to set up, modify and take down private communications loops. The processor 27 also generates Busy and the Idle messages to notify the nodes 30a–30n of various events during the establishment of private communication loops.

In an embodiment of the present invention, messages used by the switching hub 11 and the nodes 30a–30n are only a subset of what is defined by the Fibre Channel arbitrated loop protocol. This avoids the need for complicated and expensive circuitry in the switching hub 11 hardware, and requires no special modifications of the nodes 30a–30n. Also, the switching hub 11 transfers all of the messages between the nodes 30a–30n without modification, except for the Open message which is only delayed until the private loop is established. This makes the switching hub 11 virtually transparent to the nodes 30a–30n. Thus, the present invention supports other Fibre Channel classes of service at no additional cost. The transparent message transportation allows the present invention to support other protocols such as Small Computer System Interface (SCSI), Internet Protocol (IP), and the like. The present invention also allows for various media types including fiber optics, fiber optics, coax, triax, twisted shielded pair, and the like, by substituting appropriate transmitter 18 and receiver 14 circuits.

Figure 2:
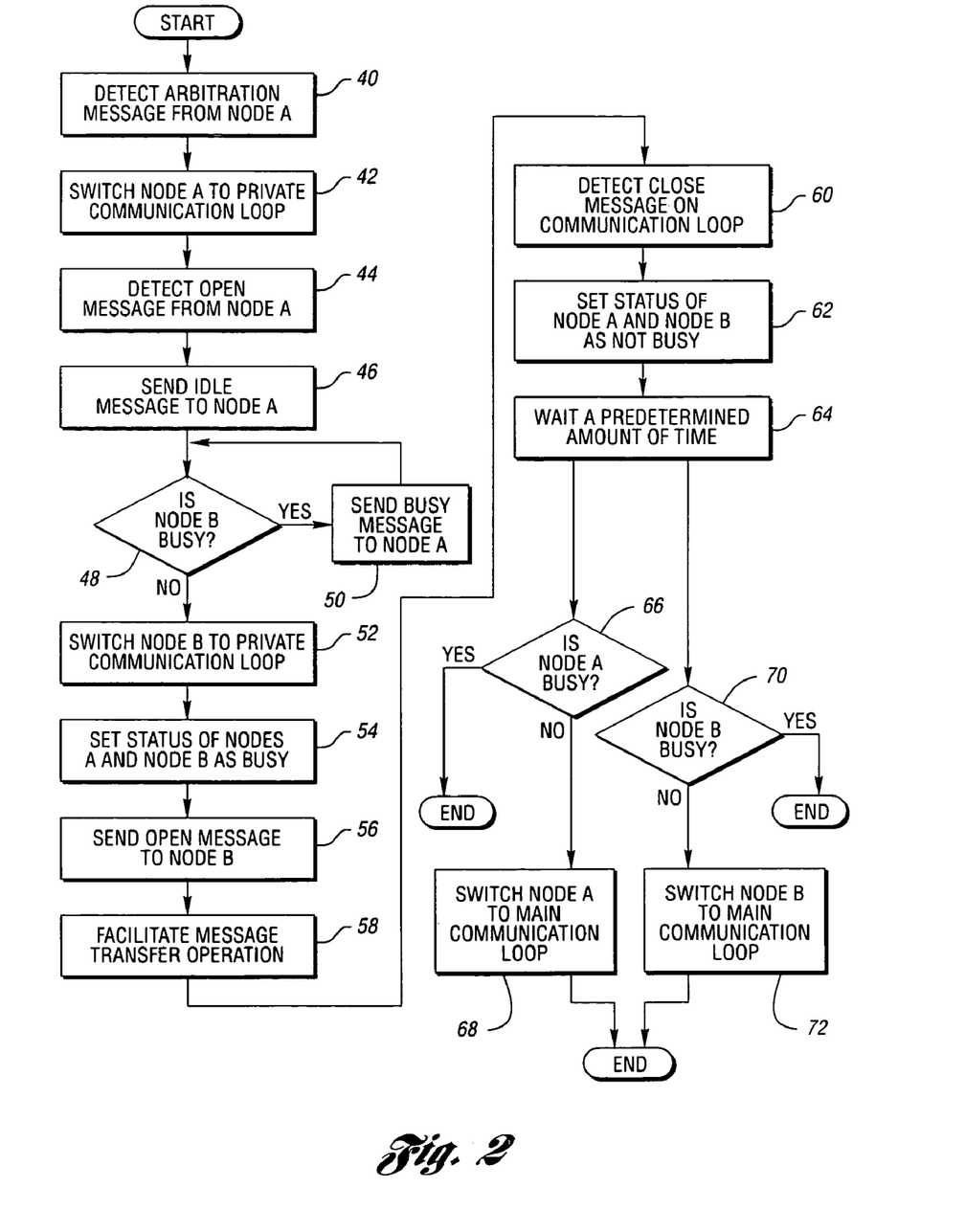
FIG. 2 is a logic flow diagram implemented by the switching hub to create and eliminate a private communication loop according to an embodiment of the present invention.

Referring now to FIG. 2, a flow diagram illustrating hub logic to create and eliminate a private communication loop according to an embodiment of the present invention is shown. As will be appreciated by one of ordinary skill in the art, the operations illustrated are not necessarily sequential operations. Similarly, operations may be performed by software, hardware, or a combination of both. The present invention transcends any particular implementation and aspects are shown in sequential flow chart form for ease of illustration.

The starting network configuration, for example, has all of the nodes 30a–30n connected in one main communication loop. Node A, such as node 30a in FIG. 1, requests to use the network by transmitting an Arbitration message. Upon detection of the Arbitration message, as in block 40, the switching hub 11 switches nodes A from the main communication loop to a newly created private communication loop, as indicated by block 42. Node A knows it has won arbitration when it receives back its own Arbitration message. After winning arbitration, nodes A transmits an Open message containing the destination address of another node, for example node B, such as node 30b in FIG. 1. When the switching hub 11 detects the Open message, as indicated by block 44, it buffers the message and sends an Idle message back to node A as acknowledgment, as in block 46. The switching hub 11 then checks the busy/not busy status of node B, as in block 48. If node B is busy, the switching hub 11 sends a Busy message to node A to notify it that node B is busy and thus not available, as in block 50. When the status of node B is not busy, the switching hub 11 switches, node B to the private loop, as in block 52. The status of both node A and node B is changed to busy, as indicated by block 54. The buffered Open message to B is released, as indicated by block 56. This Open message propagates out on sending channel 34b to node B to inform node B that node A is trying to communicate with it. Node B returns the Open message on the receiving channel 32b, back though the switching hub 11 and out to node A on sending channel 34a. When node A receives the Open message it knows that node B is available for communication. The switching hub 11 then facilitates the message transfer operations between node A and node B, as in block 58.

When node A and node B are finished transferring messages, one or both will issue a Close message. When the switching hub 11 detects the Close message, as in block 60, it changes the status of node A and node B to not busy, as in block 62. Hub 11 waits a predetermined amount of time to see if node A and node B will start another message transfer operation or not, as in block 64. After the wait indicated by block 64 times-out, the busy/not busy status of node A is checked, as indicated by block 66. If node A is busy with another message transfer operation then the switching hub 11 leaves node A on the private communication loop. If node A is not busy, then it is switched back to the main communication loop, as indicated by block 68. Similarly, after the wait, indicated by block 64, the busy/not busy status of node B is checked, as indicated by block 70. If node B is busy with another message transfer operation then the switching hub 11 leaves node B on the private communication loop. If node B is not busy, then it is switched back to the main communication loop, as indicated by block 72.

The wait indicated by block 64 allows the switching hub to operate more efficiently by avoiding the need to return the nodes to the main communication loop after each message transfer. It also allows node A and node B to request the addition of a third node to the private communication loop. This feature is useful, for example, in an embodiment where node A is a first disk controller, node B is first disk drive, and the first disk controller wishes to talk to a second disk drive. By pulling the second disk drive onto the private communication loop, the first disk controller can time share the loop bandwidth between the two disk drives in any ratio the first disk controller requires.

A third node, for example a second disk controller wishing to talk briefly to the first disk drive, can also request to be added to the private communication loop without forcing the first disk controller back into the main loop. The first and second disk controllers can then arbitrate between themselves for the appropriate amount of loop bandwidth. If the second disk controller has a priority higher than the first disk controller, the first disk controller will remain in a not busy state for a predetermined amount of time, as indicated by block 64. The first disk controller can then be switched back to the main communication loop, as indicated by block 68, leaving the second disk controller with the full bandwidth of the private communication loop.

Referring now to FIGS. 3 through 9, a series of examples of the operation of the preferred embodiment of the present invention linking a set of disk controllers C1–C3 with an array of disk or tape drives D1–D5 is shown. While controllers and drives are shown, it will be understood by one of ordinary skill in the art that controllers C1–C3 and drives D1–D5 may be any type of node. The internal circuitry of the switching hub 11 is not shown to simplify the diagrams.

Figure 3:
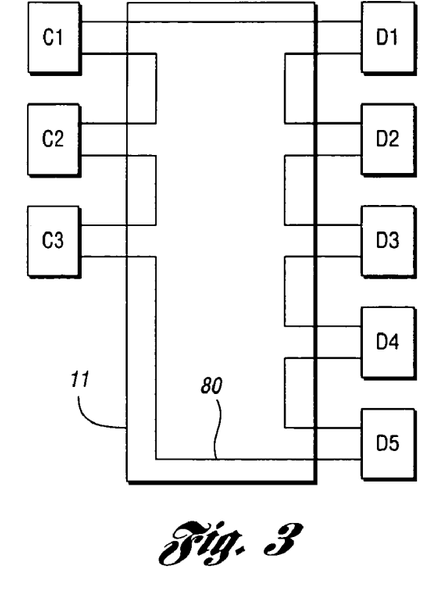
FIG. 3 is a block diagram of the network after initialization with one main communication loop according to an embodiment of the present invention.

FIG. 3 shows the network initialized with all of the nodes C1–C3 and D1–D5 connected together to form a single main communication loop 80. Other initial topologies are possible, including star, multiple rings, random connection, partially or completely disconnected, and the like.

Figure 4:
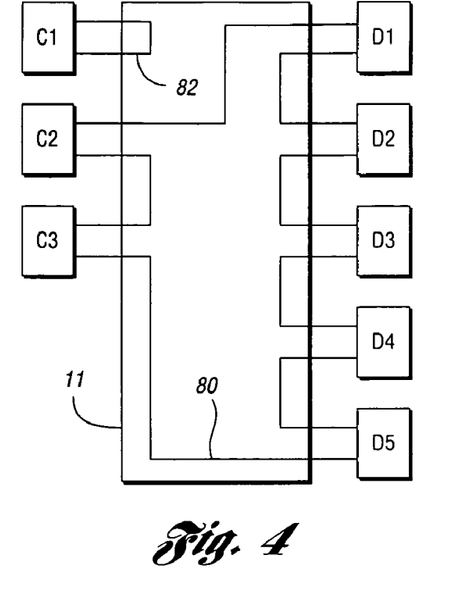
FIG. 4 is a block diagram of the network with a first disk controller switched to a first private communication loop according to an embodiment of the present invention.

FIG. 4 shows the network configuration after the first disk controller C1 has requested, and has been placed, on a first separate private communication loop 82. At this point the first disk controller C1 may issue an Open message.

Figure 5:
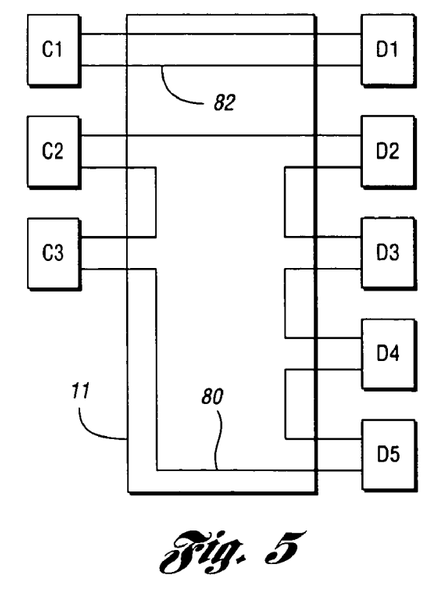
FIG. 5 is a block diagram of the network with the first disk controller communicating with a first disk drive on the first private communication loop according to an embodiment of the present invention.

FIG. 5 shows the network configuration after the disk drive D1 has been added to the first private communication loop 82. The first disk controller C1 and first disk drive D1 can now exchange messages using the full bandwidth of the private communication loop 82 without any delays due to the other disk controllers C2–C3 or disk drives D2–D5. If the first disk controller C1 and the first disk drive D1 close the message transfer operation, and the first private communication loop 82 times-out, the first disk controller C1 and first disk drive D1 are switched back to the main communication loop 80 returning the network to the configuration shown in FIG. 3.

Figure 6:
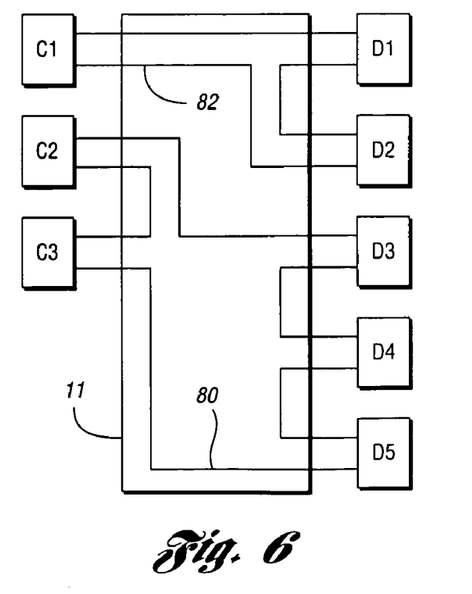
FIG. 6 is a block diagram of the network with the first disk controller communicating with first and second disk drives on the first private communication loop according to an embodiment of the present invention.

FIG. 6 shows the network configuration resulting from FIG. 5 after the first controller C1 transmits an Open message containing the second disk drive D2 as the destination address. Here the second disk drive D2 has been added to the first private communication loop 82. Now the first disk controller C1 can communicate with both the first and second disk drives D1–D2 without having to return to the main communication loop 80 to switch between the two disk drives D1–D2. The steps shown in FIG. 5 and FIG. 6 can be repeated to add more disk drives D3–D5 to the first private communication loop 82.

Figure 7:
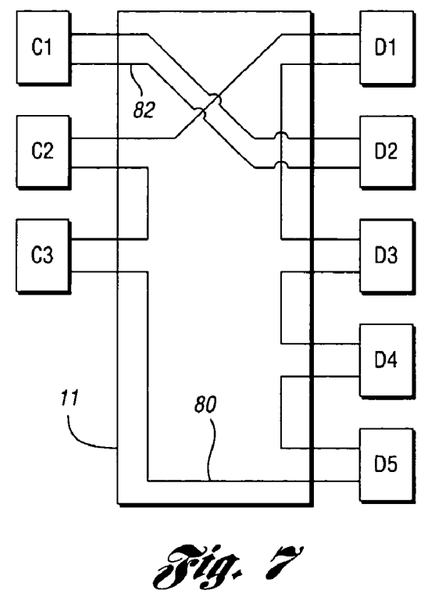
FIG. 7 is a block diagram of the network after the first disk drive has been returned to the main communication loop according to an embodiment of the present invention.

FIG. 7 shows the network configuration resulting from FIG. 6 after the first disk controller C1 stops communicating with the first disk drive D1 longer than then predetermined waiting period. After the first disk drive D1 times-out, the switching hub 11 removes the first disk drive D1 from the first private communication loop 82 and adds it back into the main communication loop 80. This leaves the first disk controller C1 and second disk drive D2 with the entire bandwidth of the first private communication loop 82 to communicate.

Figure 8:
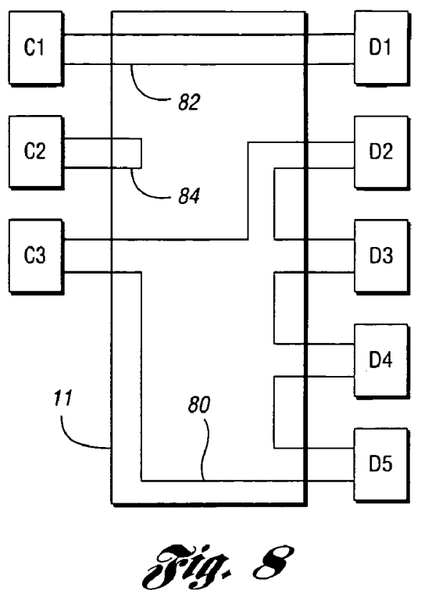
FIG. 8 is a block diagram of the network with the first disk controller communicating with the first disk drive on the first private communication loop, and the second disk controller switched to a second private communication loop according to an embodiment of the present invention.

FIG. 8 shows the network configuration resulting from FIG. 5 after the second disk controller C2 has requested, and has been placed, on a second private communication loop 84.

Figure 9:
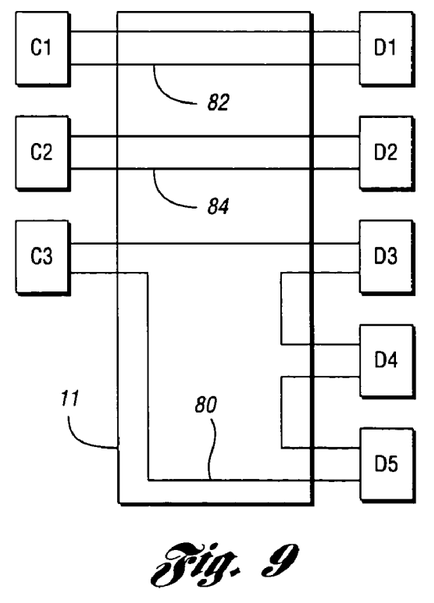
FIG. 9 is a block diagram of the network with the first disk controller communicating with the first disk drive on a first private communication loop, and the second disk controller communicating with the second disk drive on the second private communication loop according to an embodiment of the present invention.

FIG. 9 shows the network configuration resulting from FIG. 8 after the second disk controller C2 has transmitted an Open message containing the second disk drive D2 as the destination address, causing the second disk drive D2 to be switched from the main communication loop 80 to the second private communication loop 84. Now both the first disk controller C1 and second disk controller C2 can communicate with their respective disk drives D1–D2 simultaneously at the full bandwidth of the network medium. The steps shown in FIG. 8 and FIG. 9 can be repeated to create more private communication loops between other nodes in the network.

Figure 10:
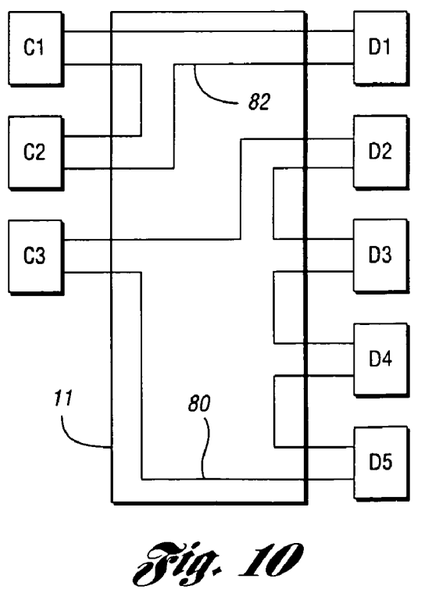
FIG. 10 is a block diagram of the network with the first disk controller and second disk controller communicating with the first disk drive on the first private communication loop according to an embodiment of the present invention.

FIG. 10 shows the network configuration resulting from FIG. 8 after the second disk controller C2 has transmitted an Open message containing the first disk drive D1 as the destination address, and the first disk drive D1 is already a part of the first private loop 82. In this case, the switching hub 11 reconfigures the first private loop 82 to add the second disk controller C2, effectively eliminating the second private communication loop 84. Now the first and second disk controllers C1–C2 must arbitrate with each other for a share of the bandwidth of the first private communication loop 82 in order to communicate with the first disk drive D1. The steps shown in FIG. 8 and FIG. 10 can be repeated to add more disk controllers C3 to the first private communication loop 82.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for controlling a plurality of message transfer operations between a plurality of nodes, the method comprises:
    detecting a request from a first node to switch the first node to a separate communication loop, the separate communication loop containing only the first node;
    switching the first node to the separate communication loop;
    detecting a request from the first node to open message transfer operation between the first node and a second node; and
    switching the second node to the separate communication loop when the second node is not busy.

2. The method of claim 1 wherein all of the nodes are switched to form a main communication loop upon initialization.

3. The method of claim 1 wherein upon initialization all of the nodes have a status of not busy, the method further comprising setting the status of the first node and the second node to busy after the second node is switched to the separate communication loop.

4. The method of claim 1 further comprising facilitating message transfer operation between the fist node and second node on the separate communication loop.

5. The method of claim 1 further comprising:
    closing message transfer operation;
    setting the status of the first node and the second node to not busy after closing message transfer operation;
    switching the first node out of the separate communication loop; and
    switching the second node out of the separate communication loop.

6. The method of claim 5 further comprising waiting for a predetermined amount of time after at least one of setting the status of the first node to not busy and setting the status of the second node to not busy before switching the first mode and the second node out of the separate communication loop.

7. The method of claim 1 further comprising:
    acknowledging to the first node the request to open message transfer operation afer detecting a request from the first node to open message transfer operation;
    notifying the first node that the second node is busy in response to the status of the second node being busy; and
    notifying the second node of the request to open message transfer operation after switching the second node to the separate communication loop.

8. The method of claim 1 further comprising:
    detecting a request from a third node to open a second message transfer operation between the third node and the second node; and
    switching the third node to the separate communication loop.

9. The method of claim 8 further comprising:
    acknowledging to the third node the request to open the second message transfer operation after detecting the request from the third node to open a second message transfer operation;
    notifying the third node that the second node is busy in response to the status of the second node being busy; and
    notifying the second node of the request to open the second message transfer operation after switching the third node to the separate communication loop.

10. The method of claim 1 further comprising:
    detecting a request from the first node to open a third message transfer operation between the first node and a fourth node; and
    switching the fourth node to the separate communication loop.

11. The method of claim 10 further comprising:
    acknowledging to the first node the request to open the third message transfer operation after detecting the request from the first node to open the third message transfer operation;
    notifying the first node that the fourth node is busy if the status of the fourth node is busy; and
    notifying the fourth node of the request to open the third message transfer operation after switching the fourth node to the separate communication loop.

12. The method of claim 1 wherein the network is a Fibre Channel arbitrated loop network.

13. A switching hub for use in a network having a plurality of nodes each connected to the switching hub by a sending channel and a receiving channel, each node sending at least one connection message, the switching hub comprising:
    an interconnect switch for connecting the sending channel and the receiving channel of each node into at least one separate communication loop;
    a plurality of port interfaces, each port interface linking the respective receiving channel and the respective sending channel of each node to the interconnect switch, each port interface detecting messages on the receiving channel; and
    a controller in communication with the plurality of port interfaces and the interconnect switch, the controller operative to form a plurality of separate communication loops, each separate communication loop based on at least one detected message, each separate communication loop consisting only of at least one requesting node and at least one node responding to the at least one requesting node.

14. The switching hub of claim 13 wherein the plurality of nodes communicate with each other using a protocol having a plurality of messages and defining message types of at least Arbitration having at least a source addresses, Open having at least a source address and a destination address, and Close.

15. The switching hub of claim 13 wherein the plurality of nodes are switched to form a main communication loop upon initialization.

16. The switching hub of claim 13 wherein the message types include Busy and Idle.

17. The switching hub of claim 13 wherein the controller is further responsive to a predetermined time-out period before releasing each node from the at least one separate communication loop.

18. The switching hub of claim 13 wherein the controller forms a separate communication loop connecting only a first node and a second node, the first node requesting access to the second node.

19. The switching hub of claim 18 wherein the controller forms the separate communication loop connecting a third node requested by the first node.

20. The switching hub of claim 18 wherein the controller forms the separate communication loop connecting a fourth node requesting access to the second node.

21. The switching hub of 13 wherein each port interface comprises:
    a receiver connected to the sending channel of one node of the plurality of nodes;
    a decoder linking the receiver to the interconnect switch, the decoder in communication with the controller, the decoder detecting messages sent to the port interface;
    a transmitter connected to the receiving channel of one node of the plurality of nodes; and
    a multiplexer linking the transmitter to the interconnect switch, the multiplexer in communication with the controller.

22. The switching hub of 13 wherein the controller comprises:
    a busy port store for identifying the status of the plurality of nodes;
    a valid arbitration loop address store for storing messages; and
    a processor in communication with the encoder, the multiplexer of each port interface, the busy port store, and the valid arbitration loop store, the processor interpreting connection messages.

23. The switching hub of 13 wherein at least one node utilizes a Fibre Channel protocol.

24. A hub interconnecting a plurality of nodes, each node having a channel over which data is transmitted and received, the hub comprising:
    a port interface in communication with each node through the channel, each port sending data over a send data path and receiving data over a receive data path;
    an interconnect device in communication with each port interface, the interconnect device operative to forward data between any send data path and any receive data path; and
    a controller in communication with each port interface and the interconnect device, the controller operative to signal the interconnect device to form a plurality of separate communication loops, each separate communication loop including only requesting nodes and nodes responding to the requesting nodes.

25. A hub as in claim 24 wherein the controller forms each separate communication loop based on a message received from at least one port included in the separate communication loop.

26. A hub as in claim 24 wherein each port interface generates the message based on signals received from at least one port in a Fibre Channel protocol.

27. A hub as in claim 24 wherein the controller establishes every port in one loop upon initialization.

28. A method of interconnecting a plurality of nodes comprising:
    forming a main communication loop interconnecting the plurality of nodes;

receiving a request from a first node to access a second node;

determining if the second node is not busy; and if the second node is not busy, forming a separate communication loop comprising only the first node and the second node, the separate communication loop formed to leave the plurality of nodes not including the first node and the second node interconnected by the main communication loop.

29. A method of interconnecting a plurality of nodes as in claim 28 further comprising:

receiving a request from the first node to access a third node;

determining that the third node is not busy; and if the third node is not busy, joining the third node in the separate loop comprising the first node and the second node.

30. A method of interconnecting a plurality of nodes as in claim 28 wherein the received request conforms to a Fibre Channel protocol.

31. A method of interconnecting a plurality of nodes as in claim 28 further comprising interconnecting each node in the main communication loop upon initialization.

32. A method of interconnecting a plurality of nodes as in claim 28 wherein the second node is detached from a second loop before forming the separate communication loop.

33. A method for controlling a plurality of message transfer operations between a plurality of nodes, the method comprises:

detecting a request from a first node to switch the first node to a separate communication loop;

switching the first node to the separate communication loop;

detecting a request from the first node to open message transfer operation between the first node and a second node;

switching the second node to the separate communication loop when the second node is not busy;

detecting a request from a third node to open a second message transfer operation between the third node and the second node;

switching the third node to the separate communication loop;

acknowledging to the third node the request to open the second message transfer operation after detecting the request from the third node to open a second message transfer operation;

notifying the third node that the second node is busy in response to the status of the second node being busy; and notifying the second node of the request to open the second message transfer operation after switching the third node to the separate communication loop.

34. A method for controlling a plurality of message transfer operations between a plurality of nodes, the method comprises:

detecting a request from a first node to switch the first node to a separate communication loop;

switching the first node to the separate communication loop;

detecting a request from the first node to open message transfer operation between the first node and a second node;

switching the second node to the separate communication loop when the second node is not busy;

detecting a request from the first node to open a third message transfer operation between the first node and a fourth node;

switching the fourth node to the separate communication loop;

acknowledging to the first node the request to open the third message transfer operation after detecting the request from the first node to open the third message transfer operation;

notifying the first node that the fourth node is busy if the status of the fourth node is busy; and notifying the fourth node of the request to open the third message transfer operation after switching the fourth node to the separate communication loop.

35. A switching hub for use in a network having a plurality of nodes each connected to the switching hub by a sending channel and a receiving channel, each node sending at least one connection message, the switching hub comprising:

an interconnect switch for connecting the sending channel and the receiving channel of each node into at least one separate communication loop;

a plurality of port interfaces, each port interface linking the respective receiving channel and the respective sending channel of each node to the interconnect switch, each port interface detecting messages on the receiving channel;

a controller in communication with the plurality of port interfaces and the interconnect switch, the controller controlling the interconnect switch to form at least one separate communication loop based on at least one detected message;

a receiver connected to the sending channel of one node of the plurality of nodes;

a decoder linking the receiver to the interconnect switch, the decoder in communication with the controller, the decoder detecting messages sent to the port interface;

a transmitter connected to the receiving channel of one node of the plurality of nodes; and a multiplexer linking the transmitter to the interconnect switch, the multiplexer in communication with the controller.

36. A switching hub for use in a network having a plurality of nodes each connected to the switching hub by a sending channel and a receiving channel, each node sending at least one connection message, the switching hub comprising:

an interconnect switch for connecting the sending channel and the receiving channel of each node into at least one separate communication loop;

a plurality of port interfaces, each port interface linking the respective receiving channel and the respective sending channel of each node to the interconnect switch, each port interface detecting messages on the receiving channel; and a controller in communication with the plurality of port interfaces and the interconnect switch, the controller controlling the interconnect switch to form at least one separate communication loop based on at least one detected message;

a busy port store for identifying the status of the plurality of nodes;

a valid arbitration loop address store for storing messages; and a processor in communication with the encoder, the multiplexer of each port interface, the busy port store, and the valid arbitration loop store, the processor interpreting connection messages.

* * * * *